Nov. 27, 1956  R. F. KIRCHHOF  2,771,683
PRECISION LAYOUT AND HEIGHT GAGE
Filed April 1, 1955
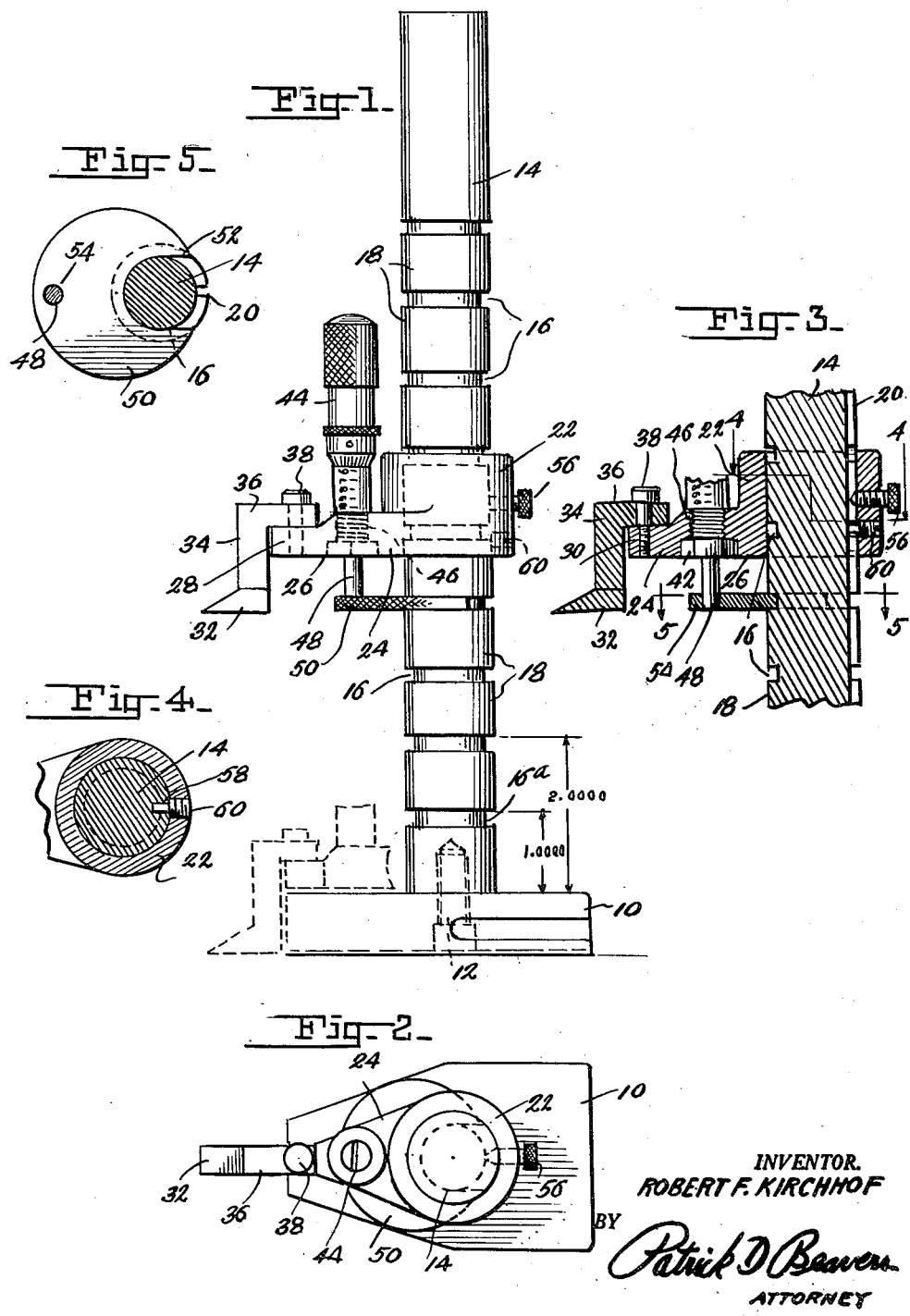
INVENTOR.
ROBERT F. KIRCHHOF
BY
Patrick D. Beavers
ATTORNEY

United States Patent Office 2,771,683
Patented Nov. 27, 1956

2,771,683

PRECISION LAYOUT AND HEIGHT GAGE

Robert F. Kirchhof, Broad Brooks, Conn.

Application April 1, 1955, Serial No. 498,648

1 Claim. (Cl. 33—170)

This invention relates to improvements in the design and construction of measuring instruments and has for its primary object to provide a gage which is novelly constructed to accurately and quickly scribe layout lines on metals or plastics or other materials, for example in the laying out of dies or other tools.

Another object of this invention is to provide a gage which includes an upstanding shaft that has a series of axially spaced locations formed therein, the locations being preferably spaced one inch apart axially of the shaft and to provide a scriber assembly that is slidably mounted on the shaft and provided with means to selectively lock it in the locations, the scriber assembly including a micrometer that acts on the scriber to adjust it within a range lying between the locations.

A further object of this invention is to provide a simply operated and accurate layout gage which can also be used as a checking instrument.

The foregoing and ancillary objects are attained by this invention, the preferred form of which is set forth in the following description and illustrated in the accompanying drawing, wherein;

Figure 1 is a side elevational view of the gage;

Figure 2 is a top plan view thereof;

Figure 3 is a fragmentary vertical sectional view;

Figure 4 is a transverse sectional view taken on line 4—4 of Figure 3, and,

Figure 5 is a transverse sectional view taken on line 5—5 of Figure 3.

Referring now more particularly to the drawing, the numeral 10 designates a base from which a mounting screw 12 upstands. The lower end of a vertical shaft 14 is secured on the screw and is disposed flat on the top of the base, the shaft being mounted perpendicularly on the base.

The shaft is provided with a series of evenly axially spaced annular grooves that are preferably spaced one inch from each other axially of the shaft. The grooves are of the same depth and define integral collars 18 on the shaft which space the grooves apart axially of the shaft. The collars are formed with slots 20 which are aligned axially of the shaft and are of a depth slightly greater than the grooves.

A sleeve 22 is circumposed on the shaft and slidable axially of the shafts over the collars, the sleeve fitting snugly over the collars. The sleeve has a radial, outwardly projecting ledge 24 on its lower end. The underside 26 of the ledge is flat and is disposed flush with the lower edge of the sleeve. The outer end 28 of the ledge has a flat upper surface and is formed with a threaded vertical opening 30 which extends through the upper and lower surfaces thereof.

A scriber 32 has an angular shank 34, the horizontal upper end 36 of which rests on the upper surface of the outer end of the ledge. The end 36 has a vertical opening which receives a screw 38 that is threaded in the opening 30 to mount the scriber on the outer end of the ledge.

The ledge is formed inwardly of its outer end with a vertical bore that is counterbored at its lower end to receive a nut 42 which is securely socketed therein transversely of the bore. A micrometer screw 44 is provided and has a threaded shank portion 46 which is threaded in the nut. A plain setting end 48 depends from the threaded portion below the ledge. A circular flat sided rest plate 50 is provided and is formed with a cut-out 52 adapted to fit in the grooves to dispose the plate radially of the shaft below the ledge. The rest plate 50 has a vertical opening 54 to seatingly receive the lower end of the micrometer setting end 48.

The sleeve 22 is locked in axially selected positions on the shaft by a thumb screw 56 which bears against a key 58. The key 58 locates the sleeve against rotational movement and is frictionally fitted in the slots 20 and carried by a set screw 60, which is disposed in a suitable radial opening in the sleeve below the thumb screw 56.

In use, to scribe a line on a work piece, considering the micrometer to be set at .000 and the lower tip thereof touching the top surface of the base, the following example is given: To scribe a line 1.500" from the base, the micrometer is set at .500" and the sleeve is moved upwardly from the base on the shaft to a position above the first location 16A. The sleeve is locked by the thumb screw 56 in position above the rest plate with the setting end of the micrometer located in the rest plate flush with the lower surface thereof. The scriber is thus locked in a position exactly 1.500" from the bottom of the base. Similar settings up to 10", in increments of .0005" can be made with absolute accuracy.

The gage can be used as a checking instrument by attaching a dial indicator on the sleeve utilizing the screw 38 to attach it to the ledge. Thus, the dial indicator would replace the scriber.

While the best known form of my invention has been shown and described, other forms may be realized as come within the scope of the invention defined by the appended claim.

What I claim is:

A gage of the type described comprising a base, a shaft upstanding from the base, a plurality of evenly axially spaced grooves formed in the shaft, a sleeve slidably disposed on the shaft, a micrometer carried by the sleeve in spaced parallel relation to the shaft, means mounting the micrometer for axial adjustment, a work instrument carried by the sleeve and depending therefrom, means for securing the sleeve in selected positions on the shaft, a horizontally disposed rest plate having means to receive the micrometer and adapted to position the sleeve on the shaft in accordance with the adjustment of the micrometer, said rest plate having means engageable with the grooves to selectively mount it on the shaft in the grooves and laterally projecting from the shaft at the desired groove, said rest plate having a cut-out receivable in said grooves.

References Cited in the file of this patent

UNITED STATES PATENTS

| | | |
|---|---|---|
| 1,291,711 | Auer | Jan. 21, 1919 |
| 2,491,612 | Jensen | Dec. 20, 1949 |
| 2,675,624 | Kristensen | Apr. 20, 1954 |